March 22, 1927. 1,621,699
G. T. WILHELM
FLUSH TANK VALVE
Filed June 10, 1926
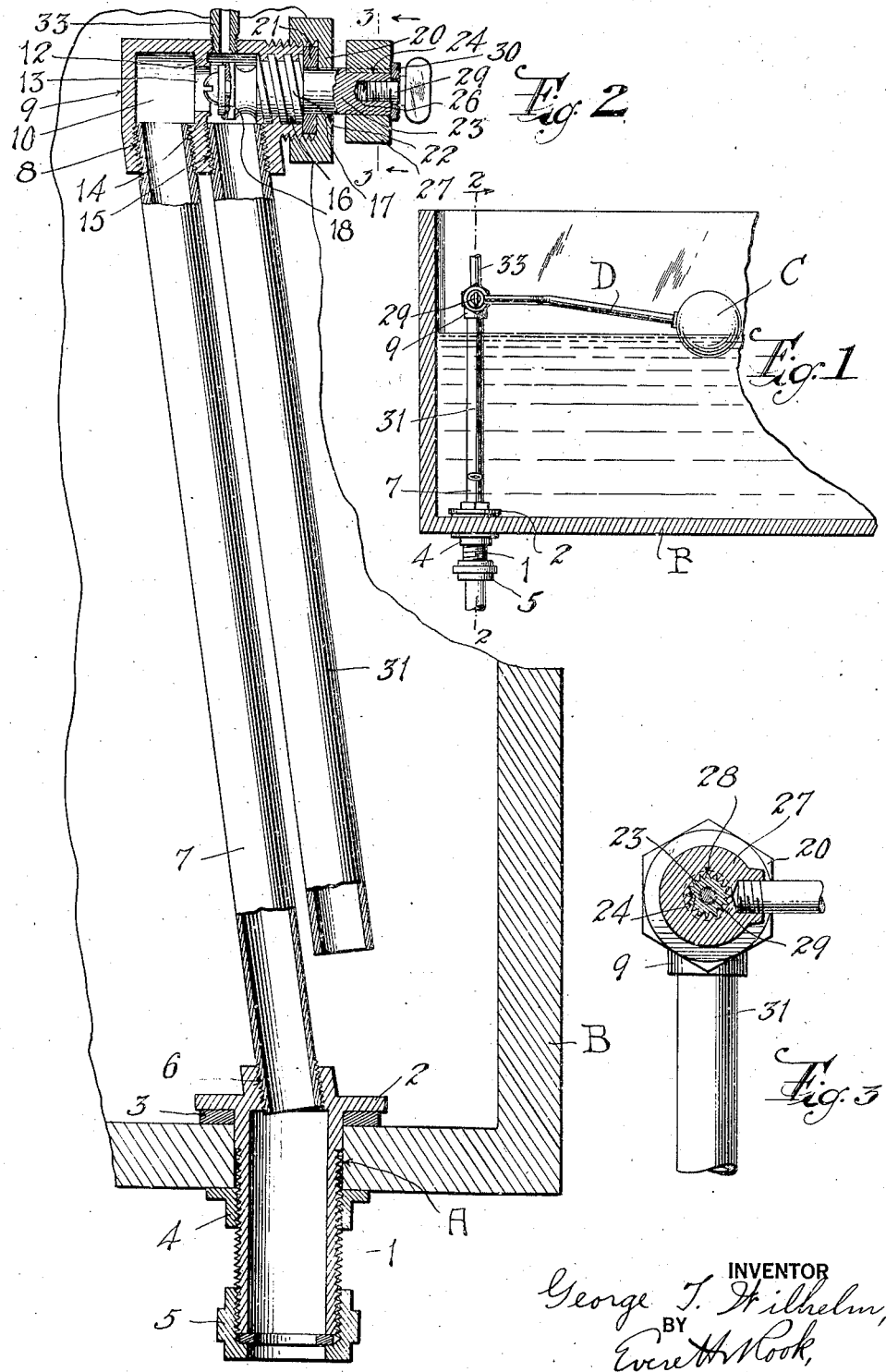
INVENTOR
George T. Wilhelm,
BY
Everett H. Rook,
ATTORNEYS.

Patented Mar. 22, 1927.

1,621,699

UNITED STATES PATENT OFFICE.

GEORGE T. WILHELM, OF SOUTH AMBOY, NEW JERSEY.

FLUSH-TANK VALVE.

Application filed June 10, 1926. Serial No. 114,878.

This invention relates to a flush tank inlet valve or what is commonly known as a ball cock, and one object of the invention is to provide a valve of this character embodying novel and improved features of construction so that the valve may be economically manufactured, easily installed and will be reliable and durable in operation.

Other objects are to provide such a valve comprised of a minimum number of simple parts and which can be installed in any of the known types of flush tanks without alteration of the usual inlet pipe connections.

Further objects are to provide such a valve embodying novel and improved features of construction whereby the valve and its casing may be located out of the water and in such position within the tank as not to interfere with the usual flush valve mechanism and so that the inlet valve may be conveniently adjusted or repaired; to thus provide a novel and improved valve casing which can be economically cast, and to obtain other results and advantages as may be brought out by the following description.

Referring to the accompanying drawings, in which corresponding and like parts are designated throughout the several views by the same reference characters, Figure 1 is a fragmentary sectional view through a flush tank showing in side elevation an inlet valve mechanism embodying the invention applied thereto;

Figure 2 is an enlarged sectional view, taken on the line 2—2 of Figure 1, and

Figure 3 is a transverse sectional view, taken on the line 3—3 of Figure 2.

Specifically describing the illustrated embodiment of the invention, the reference character 1 designates an inlet pipe coupling adapted to be arranged within an opening A in the bottom of a flush tank B, said fitting having a flange 2 adjacent one end thereof between which and the inside of the bottom wall of the flush tank is disposed a packing ring 3. A clamping nut 4 is threaded upon the fitting 1 exteriorly of the tank so as to clamp the fitting within the opening A. The outer extremity of the fitting 1 is provided with a slip joint or other suitable pipe connection 5 for joining the water supply pipe with the fitting 1. This construction so far described is old and no claim to novelty thereon is made.

The inner end of the pipe fitting 1 has an inclined threaded opening 6 which when the fitting is arranged within a flush tank diverges from the side of the tank. In this connection, it will be remembered that the water inlet opening of the flush tank is usually arranged in one corner of the tank due to the necessity of arranging the inlet valve mechanism so that it will not interfere with the outlet or flush valve mechanism which is ordinarily placed in the center of the tank. A straight pipe 7 has one end threaded in the opening 6 and has its other end threaded into an inlet opening 8 of a horizontal inlet valve casing 9.

The valve casing 9 is formed with an inlet chamber 10 and a valve chamber 11 which are separated by a transverse partition or wall 12 having an opening 13 therein. Said chambers 10 and 11 are in substantially axial alinement and at an acute angle to the axis of the inlet opening, and the side of the partition 12 in the valve chamber 11 is formed with a valve seat 14. An outlet opening 15 for the valve casing 9 is formed at one side of the valve chamber 11 and substantially parallel and in the same plane with the inlet opening 8. An opening 16 is provided in the valve casing 9 substantially co-axial with the valve chamber 11 and leading thereinto. The axes of the chambers 10 and 11, and openings 8, 15 and 16 are all in the same plane. Said opening 16 is threaded and has fitted therein a valve stem 17 at the inner end of which is arranged a valve head 18 to cooperate with the valve seat 14. The exterior of the valve casing surrounding the opening 16 is threaded at 19 to receive a gland cap 20 between which and the end of the casing is arranged a packing ring 21. The gland cap 20 has a central opening 22 through which passes a reduced shank 23 on the valve stem 17.

Outwardly of the gland cap 20 the valve shank 23 is corrugated or otherwise provided with a plurality of ribs or grooves 24 which extend to the end of the shank, and the shank is provided in its end with a central threaded opening 26.

A ball or float C for operating the valve is arranged at one end of a rod D, the other end of which is secured as by screw threads to a collar 27 which has a central corrugated opening 28 to fit the corrugated end 24 of the shank 23 of the valve stem. The collar 27 is slipped endwise onto the said corrugated end of the shank and is held thereon by means of a set screw 29 screwed into the opening 26, a washer 30 preferably being interposed between the head of the screw and the collar.

With this construction, it will be observed that rotation of the valve stem will move the stem longitudinally and seat and unseat the valve head 18 on and from the valve seat 14 so as to close and open the port 13, respectively, and rotation of the valve stem is caused by the ball C resting upon the surface of the water in the flush tank, a rise in the level of the water closing the valve and a fall in the level opening the valve. The ball C may be adjusted relatively to the valve stem to cause proper opening and closing of the valve by changing the relation of the ball to the stem through adjustment of the collar 27 on the corrugated end 24 of the shank 23.

An outlet pipe 31 is fitted into the opening 15 of the valve casing 9 and leads downwardly to a point spaced from the bottom of the tank, and in operation of the valve mechanism, when the valve is open water will flow inwardly through the pipe fitting 1, inlet pipe 7, inlet chamber 10, port 13, valve chamber 11 and outlet pipe 31 into the tank. A refill or relatively small discharge pipe 33 is connected to the valve chamber 11 for supplying water for the afterflow or water seal following the flushing of the tank.

The valve casing 9 with the co-axial inlet chamber and valve chamber 10 and 11, respectively, the co-axial valve stem 17, and the lateral inclined parallel inlet opening and outlet opening 8 and 15, respectively, is simple and relatively inexpensive to manufacture, and combined with the inlet pipe fitting 1 having the inclined opening 6, enables a straight pipe 7 to be used for locating the valve casing above the level of the water and at the same time in such position as to clear the flush valve mechanism and to permit easy and convenient access to the valve for adjustment or repair.

While I have shown and described my invention as embodied in certain details of construction, it will be understood that this is primarily for the purpose of illustrating the principles of the invention and that said details may be modified and changed by those skilled in the art without departing from the spirit or scope of the invention. Therefore, I do not desire to be understood as limiting myself except as required by the following claims when construed in the light of the prior art.

Having thus described the invention, what I claim is:

1. A flush tank valve mechanism comprising a pipe coupling to be fitted in an opening in the bottom of a flush tank and having an opening arranged at an angle to the axis of the coupling, a valve casing having an inlet opening inclined correspondingly to said opening in said coupling and an outlet opening, a valve in said casing for controlling communication between said inlet opening and said outlet opening, and a pipe having its ends connected to said opening in said coupling and said inlet opening of the valve casing, respectively, whereby the inlet of said valve casing is offset from said coupling to facilitate mounting said mechanism in a tank and adapting said pipe to be easily and quickly replaced.

2. The combination with a flush tank having an opening in its bottom, of a pipe coupling fitted in said opening and having an opening in its inner end disposed at an obtuse angle to the axis of said coupling and diverging from the adjacent side of said tank, a horizontal valve casing having an inlet opening in its under side inclined correspondingly to said opening in said coupling, said casing also having an outlet, a valve in said casing for controlling communication between said inlet and said outlet and having a horizontally projecting rotatable stem, an arm having one end connected to said stem, a float connected to the other end of said arm whereby rising and falling of said float rotates said stem, and a pipe having one end connected to said inlet opening and the other end connected to said opening in said coupling so that said pipe is inclined with respect to the sides of said tank and said valve casing offset with respect to said coupling to facilitate mounting the valve casing in a tank and adapting said pipe to be easily and quickly replaced.

GEORGE T. WILHELM.